June 30, 1970   R. D. SKORHEIM   3,518,675
APPROXIMATING THE NETWORKS FOR A BEAMFORMING TRANSDUCER ARRAY
Filed Feb. 25, 1969   2 Sheets-Sheet 2

INVENTOR.
ROBERT D. SKORHEIM
BY
ATTORNEYS

United States Patent Office 3,518,675
Patented June 30, 1970

3,518,675
APPROXIMATING THE NETWORKS FOR A BEAMFORMING TRANSDUCER ARRAY
Robert D. Skorheim, San Diego, Calif., assignor to the United States of America as represented by the Secretary of the Navy
Filed Feb. 25, 1969, Ser. No. 802,074
Int. Cl. H04b 11/100
U.S. Cl. 340—5          4 Claims

ABSTRACT OF THE DISCLOSURE

To form a beam with an array of transducers, the amplitude and phase of the movement of the radiating faces must have precise values with respect to the values of amplitude and phase of the faces of the other transducers. An empirical method for easily and reliably obtaining the complex numbers corresponding to the voltages, E, and/or the currents, I, for driving the transducers of an array comprises first, mounting a reference transducer on the axis of rotation of the array. A wave is transmitted from the reference transducer to a remote hydrophone, the amplitude being fixed at some arbitrary amplitude. Then the same wave is transmitted from one of the transducers (the $i$th) of the array to the hydrophone, and the phase of that wave is adjusted until the pressure wave at the remote hydrophone is zero. By repeating this process for each of the transducers of the array, a set of complex numbers is obtained which makes it possible to calculate the magnitude and phase of the driving function to each of the transducers of the array for producing the desired sound pressure pattern or beam.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

It is possible to estimate the phases and amplitudes of the electric signal to be fed to each of the transducers of a simple array to produce a certain beam. If the input networks are then designed and installed, the array generally produces the desired beam.

Unfortunately, the performance of complex arrays seldom substantiates the calculations. Generally, the problem lies in not being able to determine, on a theoretical basis, the necessary quantities which must be used to predict the performance of the array. Also, part of the problem lies in not being able to keep constant the distance between the center of rotation of the array and the calibrating hydrophone. Any change in this distance appears predominantly as a phase error in the hydrophone output voltage.

Accordingly, the principal object of this invention is to provide a novel means for reliably and easily producing the complex values necessary in the calculation for the networks of the transducers of an array for effecting any desired beam or pressure pattern.

SUMMARY OF THE INVENTION

The objects of this invention are obtained by mounting the array to be tested upon a vertical axis at the expected center of rotation of the array, and placing a reference signal source precisely on this axis. A wave of fixed frequency is transmitted from the reference source to a remote receiving hydrophone. The amplitude of the wave is also fixed and is selected at any arbitrary level, which for convenience will be considered unity. The array, considered for simplicity to be linear, is set at any desired angle $\theta$, other than 90°, with respect to the line to the remote hydrophone. One, or the $i$th, transducer of the array is energized by the same wave that is applied to the reference source. Now, the phase of the wave to the $i$th transducer is adjusted until the output of the remote hydrophone is zero. Without changing the reference source, the process is repeated for each of the remaining transducers of the array and the phase of each wave for nulling purposes is recorded. The necessary parameters for calculating a driving voltage or current to each of the transducers for producing a beam at the selected direction $\theta$ are now known. That is, if $E_i$ is the complex input voltage of the $i$th transducer of an array necessary to produce sound pressure P at remote point X, when the transfer function, relating the velocity $v$ of the $i$th transducer to $P(X)$, is $H_i(X)$, it becomes apparent that $$P(X) = \sum_i H_i(X) E_i$$

For a simple array the transfer functions $H_i(X)$ can be calculated from theory; and for the desired pressure pattern, the $E_i$'s can be calculated on a least square basis, where there are more $P(X)$'s than $E_i$'s. In complex arrays, however, this approach is not feasible. Disclosed here is a reliable experimental system, and method, to find the $H_i(X)$'s from which the $E_i$'s for a desired pressure pattern can be computed.

DESCRIPTION OF THE PREFERRED EMBODIMENT

Figure 1:
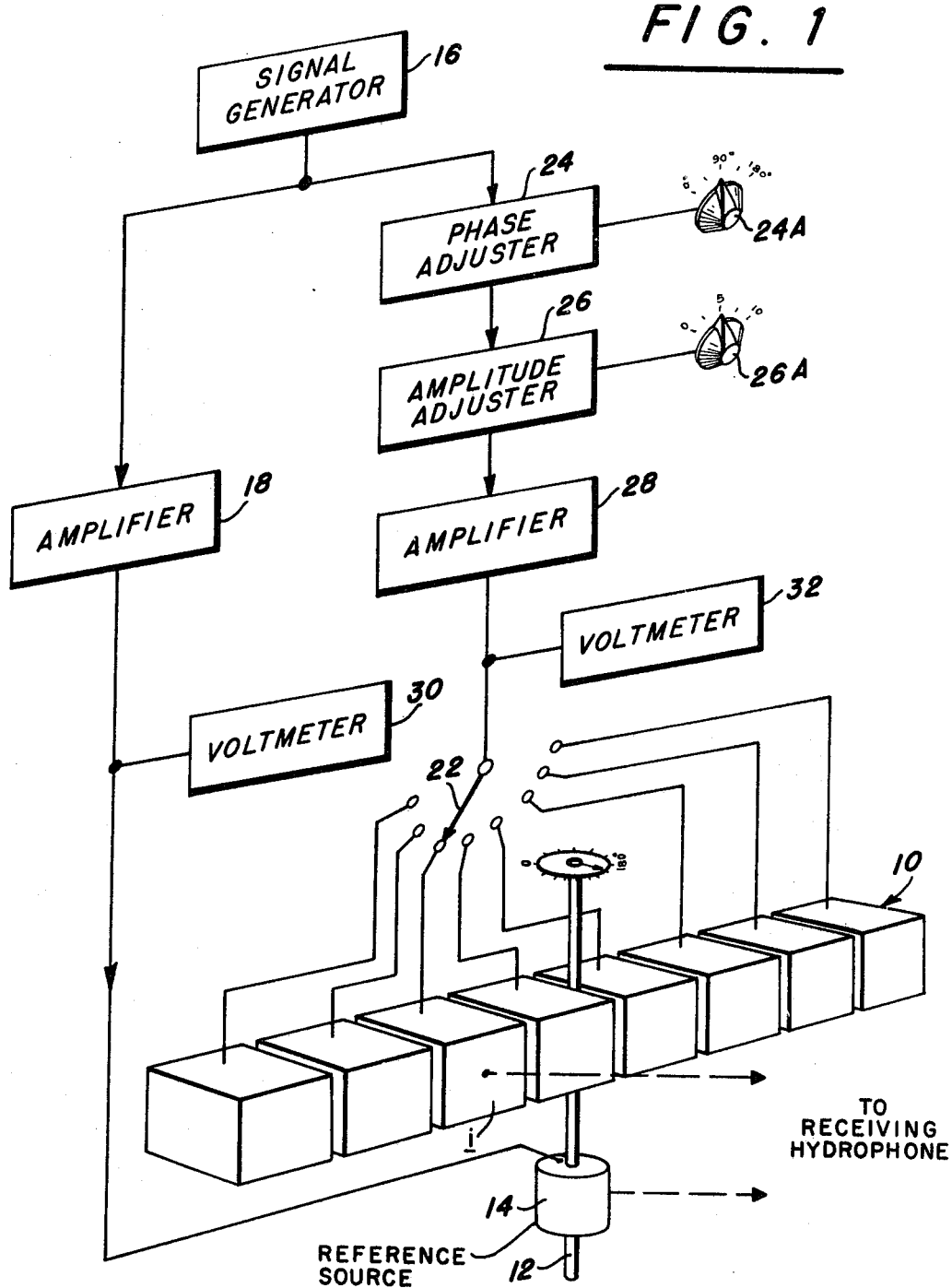
FIG. 1 shows a block diagram of the transmitting portion of the test equipment of this invention for calibrating an array of transducers.

In FIG. 1 is shown an array 10 of transducers. Without minimizing the generality of this invention and for the purpose of simplifying the description, the array will be considered to be linear and to have any number of transducers greater than 2. Rectangles are shown at each transducer position to define the volumetric space occupied by the transducers; the nature of the transducer is not important to this invention. Each transducer can be omnidirectional or directional.

The array is mounted upon the vertically disposed shaft 12 which can turn up to at least 180° for test purposes. At 14 is shown the reference source transducer which is centered on and keyed to the shaft 12 and is omnidirectional in that the acoustic field in any direction from the transducer is of equal intensity.

At 16 is shown a signal generator which preferably is adjustable over the entire frequency range expected for the array. Another convenience after the signal generator would be means for measuring out short pulses from the output of the generator to minimize feedback or echo effects in a test pool. After amplification at 18, the signal is applied to the reference transducer 14. The reference wave may be sinusoidal as shown at R in FIG. 4 and is transmitted from source transducer 14 to the remote receiving hydrophone 20 shown in FIG. 2.

By means of the manual switch 22, the signal wave of generator 16 can be applied selectively to each of the transducers of array 10.

Phase adjuster 24 and amplitude adjustor 26 are connected between the generator 16 and the array so that the phase and amplitude of the signal applied to each transducer 10 are accurately adjustable. Final amplification at 28 is employed to make it possible to obtain equal signals at the remote receiver. Voltmeters 30 and 32 are convenient for comparing gross voltages.

Preferably, the phase and amplitude adjustors are each manually adjustable by calibrated dials 24A and 26A so that the amplitude and phase of each signal can be accurately read and recorded.

Figure 2:
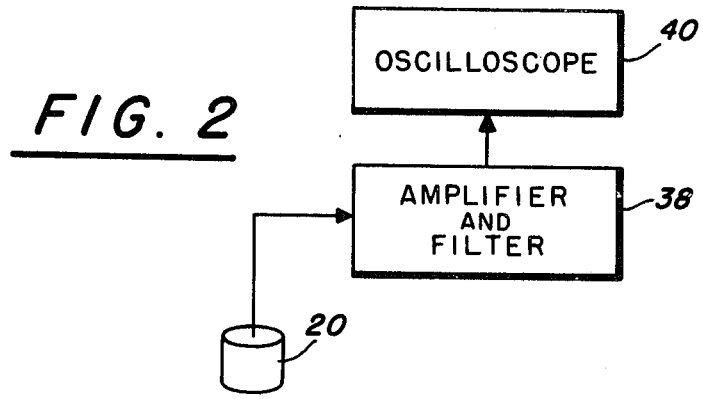
FIG. 2 is a block diagram of a remote receiving station for cooperation with the transmitter of FIG. 1.
Figure 3:
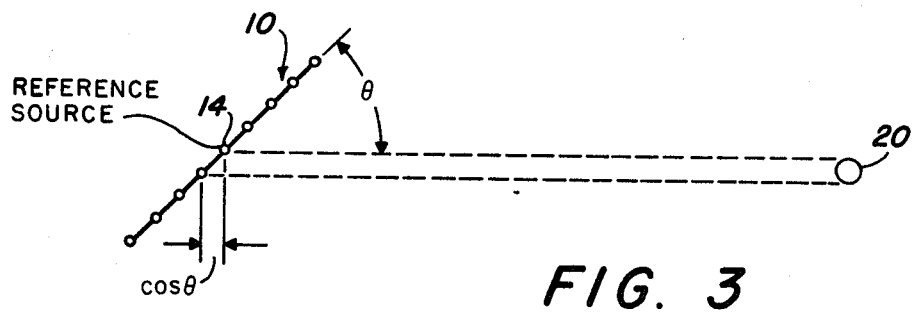
FIG. 3 is a line diagram showing the geometry of the array of FIG. 1.
Figure 4:
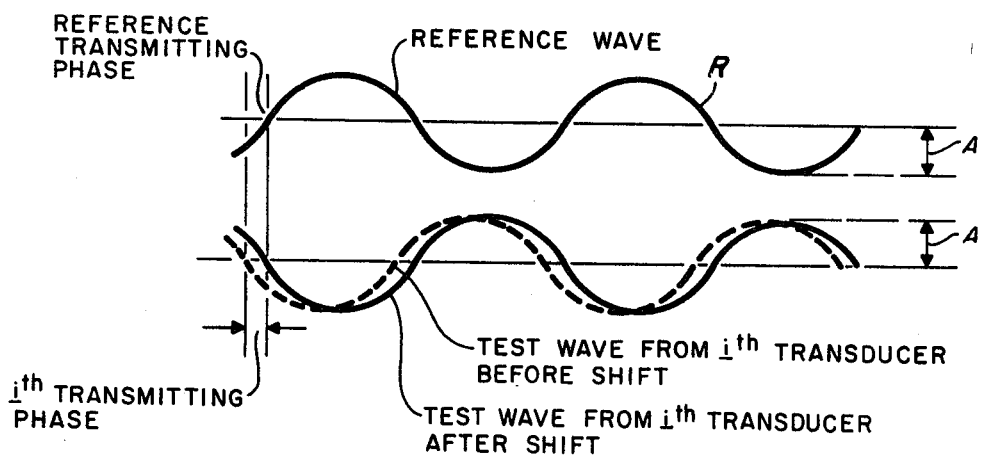
FIG. 4 is a family of sinusoidal waves which might be used in calibrating the array of FIG. 1.

The signal received at the remote hydrophone 20, FIG. 2, is amplified and filtered at 38 to remove noise and is preferably applied to the oscilloscope 40, so that the waveforms of the type shown in FIG. 4 can be viewed.

OPERATION

First the angle $\theta$ is selected, then the signals of the type shown at R in FIG. 4 are amplified at 18 and are applied to the reference source transducer 14. After transit through air or water, the waveform is observed on the screen of the oscilloscope 40. The amplitude of the reference wave is adjusted to some convenient value A. The phase of this wave is fixed and will be assumed to be zero. Next, switch 22 is set to connect the generator 16 to one of the transducers of the array. If the driven transducer $i$ is at a longer or shorter distance, cos $\theta$, of the reference transducer from the receiver 20, the phase of the signal of the driven transducer will correspondingly lag or lead the reference signal. According to the preferred embodiment of this invention, waves from the two transducers arrive at the hydrophone 20 in exact phase opposition. To this end, adjustor 24 is manipulated until the two waves are in opposition as indicated on the oscilloscope or as indicated by a null voltage on a voltmeter, not shown. Precise nulling may require some adjustment of the amplitude at 18, 26, or 28.

The time phase of the signal applied to the $i$th transducer must be shifted additional $\theta$ degrees as shown in FIG. 4, to bring about nullity at the receiver 20.

The above process is repeated for each of the other elements of the array transducer for angle $\theta$. Then, at different angles $\theta$, readings are taken to adequately describe the desired sound pressure field, which typically can be a narrow beam.

The time phase of the signal applied to the $i$th trans- of the array will not be an absolute quantity but will be relative to the phase of the reference source. However, all measurements of phase are made relative to one fixed source; therefore, the phase of one transducer relative to another will be correct. This is sufficient to assure reasonable reliability in the computation of E's for a given sound pressure pattern.

What is claimed is:

1. The method of determining the phase and amplitude of the signal voltage, $E_i$, to be applied to each transducer of a fixed array to produce a predetermined far-field acoustic pressure, P, where the transfer function of each transducer equating $E_i$ to P at point X, is $\overline{H}_i(X)$, said method comprising:
    transmitting a reference signal of fixed frequency, amplitude, and phase from the center of said array;
    successively transmitting a signal of said frequency from each transducer of said array;
    receiving all transmitted signals at a remote point, and successively combining each transducer signal with said reference signal;
    adjusting the amplitude and phase of each transducer signal as the signal is transmitted until the signal, when combined with said reference signal at the mentioned receiving point, becomes a minimum thus establishing the relative transfer functions for the transducers; and
    finally adjusting the amplitude and phase of signals applied to said transducers in accordance with the measured transfer function to produce said pressure pattern.

2. A system for calibrating an array of transducers for producing a desired sound pressure pattern, said system comprising:
    mounted transducers in a predetermined fixed array;
    an omnidirectional reference transducer mounted at the center of rotation of the beam of said array;
    a signal generator;
    a direct coupling between the output of said generator and said reference transducer;
    means selectively coupling the output of said generator and each of the transducers of said array;
    means for adjusting the amplitude and phase of the signal applied to each of the array transducers for nulling the radiation of each transducer against the reference signal; and
    means for indicating the amplitude and phase of the signal applied to each array transducer.

3. The system defined in claim 2 further comprising:
    a remote hydrophone for receiving signals transmitted by said transducers; and
    means coupled to said hydrophone for comparing the phase and amplitude of the reference signal with the phase and amplitude of each signal from the transducers of said array.

4. The system defined in claim 3 further comprising:
    means for quantitatively measuring and recording or displaying the amount of phase shift required in the signal to each array transducer to produce null.

References Cited

UNITED STATES PATENTS 3,378,846   4/1968   Lowenschuss _____ 343—100

RICHARD A. FARLEY, Primary Examiner

U.S. Cl. X.R.

343—17.7, 100